(12) United States Patent
Bougon et al.

(10) Patent No.: US 11,410,107 B2
(45) Date of Patent: Aug. 9, 2022

(54) SYSTEMS AND METHODS FOR REAL-TIME DETERMINATION OF COST-TO-SERVE METRICS AND COST ATTRIBUTION FOR CLOUD APPLICATIONS IN THE PUBLIC CLOUD

(71) Applicant: salesforce.com, inc., San Francisco, CA (US)

(72) Inventors: Steven Bougon, San Francisco, CA (US); Ashraya Raj Mathur, Fremont, CA (US); Bruno Manuel Torres Gomez, San Francisco, CA (US); Ronnie Fong, San Francisco, CA (US); Jiten Oswal, San Francisco, CA (US); Mihirsinh Raol, Fremont, CA (US); Jianxun Jason Ding, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 204 days.

(21) Appl. No.: 16/677,237

(22) Filed: Nov. 7, 2019

(65) Prior Publication Data

US 2021/0142254 A1 May 13, 2021

(51) Int. Cl.
*G06Q 10/06* (2012.01)
*G06F 9/50* (2006.01)
*G06F 3/04842* (2022.01)

(52) U.S. Cl.
CPC ... *G06Q 10/06393* (2013.01); *G06F 3/04842* (2013.01); *G06F 9/5077* (2013.01); *G06Q 10/06315* (2013.01); *G06Q 10/06375* (2013.01)

(58) Field of Classification Search
CPC ....... G06Q 10/06393; G06Q 10/06315; G06Q 10/06375; G06F 3/04842; G06F 9/5077
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Walterbusch, M., Martens, B., & Teuteberg, F. (2013). Evaluating cloud computing services from a total cost of ownership perspective. Management Research Review, 36(6), 613-638. doi:http://dx.doi.org/10.1108/01409171311325769 (Year: 2013).*

*Primary Examiner* — Folashade Anderson
(74) *Attorney, Agent, or Firm* — LKGlobal | Lorenz & Kopf, LLP

(57) ABSTRACT

Systems and methods for a cost-to-serve (CTS) service to measure total cost-to-serve and cost attributions by a plurality of CTS agents spawned across dynamic resources to capture information from a set of instances associated with the plurality of resources; a CTS agent transaction module to publish a set of metrics established by the CTS agent for each instance and usage type; a CTS service collector module to aggregate from each CTS agent, one or more instances from the set of instances to generate transaction metrics; a CTS measurement service module for measuring a total cost for each selected transaction stored at the CTS store based on at least a cost per unit; a CTS metrics processor module for aggregating metrics related to the transactions to determine total cost and set of cost attributions for a selected cloud; and a CTS metrics analytic module to provide cost attribution analytics in the selected cloud in an analytics display.

12 Claims, 11 Drawing Sheets

(58) Field of Classification Search
USPC ........................................................ 705/7.38
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobsen |
| 8,015,495 B2 | 9/2011 | Achacoso et al. |
| 8,032,297 B2 | 10/2011 | Jakobsen |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,432,722 B2 * | 10/2019 | Jain .................. G06F 9/5077 |
| 10,678,602 B2 * | 6/2020 | Manglik ................. G06F 8/61 |
| 10,963,294 B2 * | 3/2021 | Fornash ............... G06F 9/5077 |
| 11,171,845 B2 * | 11/2021 | Papacica ............. H04L 41/5051 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobsen |
| 2009/0177744 A1 | 7/2009 | Marlow et al. |
| 2011/0247051 A1 | 10/2011 | Bulumulla et al. |
| 2012/0022910 A1 * | 1/2012 | Chi ...................... G06F 9/5072 |
| | | 705/7.22 |
| 2012/0042218 A1 | 2/2012 | Cinarkaya et al. |
| 2012/0218958 A1 | 8/2012 | Rangaiah et al. |
| 2012/0233137 A1 | 9/2012 | Jakobsen et al. |

(56) References Cited

U.S. PATENT DOCUMENTS

| | | |
|---|---|---|
| 2013/0212497 A1 | 8/2013 | Zelenko et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2013/0247216 A1 | 9/2013 | Cinarkaya et al. |
| 2014/0040656 A1* | 2/2014 | Ho .................. G06F 11/3093 714/3 |
| 2014/0068073 A1* | 3/2014 | Peles .................. H04L 67/02 709/224 |
| 2014/0279201 A1* | 9/2014 | Iyoob .................. G06F 9/5077 705/26.7 |
| 2015/0363851 A1* | 12/2015 | Stella .................. G06Q 30/0631 705/26.41 |
| 2016/0321115 A1* | 11/2016 | Thorpe .................. G06Q 10/0631 |
| 2017/0279826 A1* | 9/2017 | Mohanty .................. H04L 67/1004 |
| 2018/0287864 A1* | 10/2018 | Hockett .................. G06N 20/00 |
| 2021/0141708 A1* | 5/2021 | Mathur .................. G06F 11/3409 |

* cited by examiner

SYSTEMS AND METHODS FOR REAL-TIME DETERMINATION OF COST-TO-SERVE METRICS AND COST ATTRIBUTION FOR CLOUD APPLICATIONS IN THE PUBLIC CLOUD

CROSS-REFERENCES TO RELATED APPLICATIONS

This Application is related to U.S. Non-Provisional Application, entitled SYSTEMS AND METHODS FOR DETERMINING OPTIMAL COST-TO-SERVE FOR CLOUD APPLICATIONS IN THE PUBLIC CLOUD, Ser. No. 16/677,145, filed on Nov. 7, 2019.

TECHNICAL FIELD

Embodiments of the subject matter described herein relate generally to measuring the runtime cost-to-serve service of applications distributed across multiple platforms, services and customers, and more particularly to an automated cloud-agnostic method and system implementing cost-to-serve agents that are executed on hosted public cloud hardware and collect service usage statistics for each service and instance of use for measuring the actual runtime cost-to-serve service and cost attribution across multiple customers and applications.

BACKGROUND

Current software development is evolving away from the client-server model toward network-based processing systems that provide access to data and services via the Internet or other networks. That is, in contrast to traditional methods that host networked applications on dedicated server hardware, a "cloud" computing model allows applications to be provided over the network "as a service" or "on-demand" by an infrastructure provider, the development trend is for the infrastructure provider to deliver a customer-developed application so that the customer no longer needs to operate and support dedicated server hardware by abstracting the underlying hardware and other resources used. This type of cloud computing model can often provide substantial cost savings to the customer over the life of the application because the customer no longer needs to provide dedicated network infrastructure, electrical and temperature controls, physical security, and other logistics to support dedicated server hardware to host an application.

With the growth of the public cloud infrastructure and to justify the move of applications to the public cloud, there must be enabled more cost savings and more efficiency in the runtime of the public cloud-hosted applications. Hence, it is incumbent on businesses to show cost savings for customers when promoting public cloud hosting services and customers to be able to quantify the savings that result from application runtimes in the public cloud. In other words, there is a necessity to run systems with reduced cost, increased efficiency, and deliver business value at the lowest price point when moving services to the public cloud. In addition, given the multi-tenant architecture incorporating multiple applications and features in use across multiple platforms, networks and customers, there is a need for cost-to-serve service analysis of cost attribution across customers and across applications and features; particularly when executing applications on the similar if not the same networks and systems.

It is desired to provide an enhanced solution for measuring cost metrics near real-time and to enables wholly or at least near full agnostic automated tools for determining the cost attribution for various customers and across applications with feature comparisons in a public cloud environment.

Current systems fail to provide an adequate solution for measuring the runtime cost-to-serve of applications distributed across multiple platforms, services, and customers, with automated cloud-agnostic methods and systems implementing cost-to-serve agents, which are executed on hosted public cloud hardware and collect service usage statistics in a multi-tenant environment. Hence, systems and methods are thus needed which address these shortcomings.

BRIEF DESCRIPTION OF THE DRAWINGS

A complete understanding of the subject matter may be derived by referring to the detailed description and claims when considered in conjunction with the following figures, wherein like reference numbers refer to similar elements throughout the figures.

DETAILED DESCRIPTION

Figure 1:
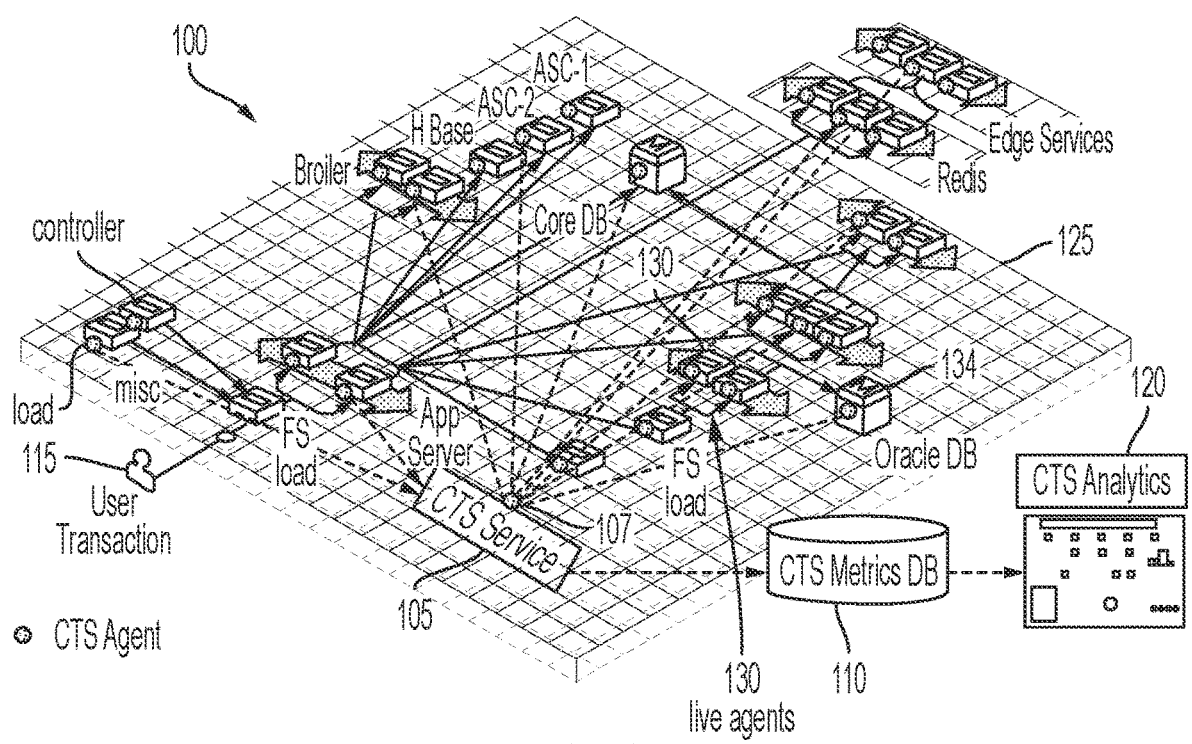
FIG. 1 is an exemplary functional diagram illustrating a cost to serve service system for measuring cost applications in the public cloud performance in accordance with an embodiment.

Embodiments of the subject matter described herein generally relate to systems and methods for measuring the cost attributions of cloud applications by a CTS service and displaying various aggregated metrics based on various automated or selected parameters using a graphic user interface for displaying to a user and for enabling the user the realize the actual cost for operating various cloud applications. In exemplary embodiments, cost metrics are derived from a set of spawn agents for monitoring usage and instances of various cloud resources and sending data of the instances and usages to analytic processors for aggregating and displaying to a user.

It is desirable to further enhance this evolving development and deployment application architecture by providing a framework for cloud-agnostic Cost-To-Serve cost attributions which abstracts public cloud infrastructure deployment, application deployment, launching applications, thereby enabling automating end-to-end use case scenarios, collecting holistic CTS measurements and determining cost attributions for various cloud applications. In other words, it is desirable to enable a solution that integrates CTS analysis for cloud applications with cost analysis in a convenient use architecture. This enables end-users to gain insight into the actual operating costs of cloud applications in a hosted webspace and cost attributions of resources or features implemented.

In addition, with the use of automated resource provisioning techniques, the implementation of CTS services is enabled for this architecture, thereby adapting the available resources to available budgets. This is essential for improving efficiency aspects and reducing costs by identifying cost allocations for various cloud applications and enable proper expensing and guaranteeing of the quality of service (QoS) requirements for latency or response time ordinarily required for web servers with higher traffic load, data stream processing, or real-time big data analytics. It is desirable to implement the CTS services in cloud platforms and virtualized data-centers by various auto-scaling mechanisms that can make automated resource provisioning decisions based on cost attributions of specific infrastructure and/or service performance to accurately predict costs and cost attributions for processing particular loads and applications of a distributed server in order to reduce infrastructure costs.

Accordingly, it is desirable to provide a CTS framework for proactive performance cost monitoring and cost attribution, which is capable of identifying cost attributions prior to server application launches and on-going executions. In addition, it is desirable to automate CTS services by gathering metrics of virtual end-to-end scenarios of server use-cases, transactions, and requests and further gather performance metrics of each server ecosystems and technology layer for such processes enabling a holistic CTS measurement of the metrics of the processes of a particular server configuration.

It is desirable to integrate the server configuration CTS measuring with the server app development life cycle so developers can collect measured CTS metrics when actually developing and adding, subtracting, or otherwise modifying features and resources of server configurations and server apps in development.

It is desirable to provide automation tools that do not require manual or developer intervention to perform the CTS measuring, rather which provide automated actions for individual apps and feature developers to analyze CTS cost attributions in a chosen use case during the development cycle. In addition, when application testing, it is desirable to have one implementation that provides a cross-platform and another that provides a cross-device framework for scalable and fully automated mobile, server, and network CTS cost attributions.

It is desirable to use a multi-tenant cloud-based architecture integrated with the automated app CTS service to improve collaboration, integration, and community-based cooperation between CTS agents within tenant organizations without sacrificing data security. Multi-tenancy refers to a system where a single hardware and software platform simultaneously supports multiple user groups (also referred to as "organizations" or "tenants") from a common data storage element (also referred to as a "multi-tenant database").

The multi-tenant design provides a number of advantages over conventional server virtualization systems. First, the multi-tenant platform operator can often make improvements to the platform based upon collective information from the entire tenant community. Additionally, because all users in the multi-tenant environment execute apps within a common processing space, it is relatively easy to grant or deny access to specific sets of data for any user within the multi-tenant platform, thereby improving collaboration and integration between apps and the data managed by the various apps. The multi-tenant architecture, therefore, allows convenient and cost-effective sharing of similar app features between multiple sets of users and CTS agents.

Embodiments of the subject matter described herein generally relate to systems and methods for measuring the cost attributions of cloud applications using application use-case scenarios to model cost metrics from a plurality of use-case scenarios of cloud applications.

As described in greater detail below, primarily in the context of FIG. 1 in exemplary embodiments, app servers and database servers support a desired configured server's performance tracking. In this regard, for each server of the server configuration responds to requests by a server app (i.e. hosted by the app server or in the cloud) for a CTS monitoring API that receives the identifier assigned to that server request and then tracks the amount of costs or other cost usage metrics associated with the server processing and responding to the server request, such as, for example, the cost attributions for elapsed time between initiating processing of the request and transmitting a response back to a client application at the client device, alternatively referred to herein as the server processing time (SPT). The CTS service monitoring API stores or otherwise maintains the server CTS metrics in association with the respective server requests or transactions. In this regard, in exemplary embodiments, after an app server finishes executing a request or at an instance, a virtual app or server app transmits or otherwise provides the CTS metrics associated with the various server requests to the CTS monitoring API for storage and/or maintenance in association with the server CTS metrics. For example, the CTS monitoring API may generate a log entry in a database or other data storage element that associates the server CTS metrics with the identifier to the corresponding server request, and thereby uniformly formats and maintains the relationships between various server CTS metrics for retrospective analysis.

By virtue of the CTS cost attributions and monitoring being distributed among the server/cloud sides, the perceived cost savings by balancing the resources used for performance relative to overburdening any one of the resources of the server sides can be realized. Additionally, having the server sides track CTS metrics associated with each server requests provides improved granularity and differentiation between the amount of time attributable to the overall processing versus the amount of time attributable to the server-side processing by viewing aggregated cost attributions. The performance monitoring API is also capable of assembling and formatting the cost attribution data in a manner that allows for the CTS data to be integrated or incorporated into any number of different database servers for storage or visualizations. In this regard, maintaining associations between server requests and corresponding CTS cost attribution metrics as well as differentiating between client and server-side metrics allows for drill-down into the details of what request, behavior, or actor is the primary cost contributor to the overall process.

The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. The subject matter may be implemented in numerous ways, including as a process, an apparatus, a system, a device, a method, a computer-readable medium such as a computer-readable storage medium containing computer-readable instructions or computer program code, or as a computer program product comprising a computer-usable medium having a computer-readable program code embodied therein.

The solution provides a CTS service framework for cross-platform and cross-device cost attribution systems, which virtualizes the launching and execution of cloud applications, the controlling client, server, and network devices, the automating page-flows and the collecting of CTS measurements for these page-flows and requests. By integrating CTS analysis for the client, server, and network apps into the product development lifecycle with an easy to use architecture, product developers are able to analyze performance for development use cases without requiring manual intervention.

With reference to FIG. 1, FIG. 1 is a functional diagram illustrating a system for measuring cost attributions for cost analysis of deployed resources for use by cloud applications in accordance with an embodiment. In FIG. 1, the cost to serve service system 100 measures the cost of runtimes of use-case scenarios for various cloud applications with deployed resources for a customer using a web hosting service. In FIG. 1, a pod configuration 125 (i.e., cloud) with various deployed resources of an elastic server configured in part by an orchestration process. The orchestration process is based on the user transaction 115 (i.e., input data) and to ensure that the appropriate resources are deployed in the pod configuration 125. The set of resources deployed a quantity and types of database servers 134, app servers 130, and other resources such as storage servers, load balancers, and network servers for a desired pod configuration 125.

A cost-to-serve service (CTS) module 105 is configured and implemented with each of the resources to spawn a plurality of CTS agents 107 to each resource, input, controller etc. to monitor and to run on every public cloud hardware host, collect service usage statistics for every service and instance in use and send these metrics to the Cost-To-Serve Service module 105 to determine real-time usage and costs of the deployed resources in the configured pod architecture. This also enables an analysis of cost attribution across multiple customers and multiple applications, services, and features without requiring any manual intervention. Each CTS agent 107 receives data to send for processing by the CTS service module 105 and for storing at a CTS metric database 110. The data sent is analyzed and displayed by a CTS analytics engine 120. The CTS Agent for each instance type (i.e., each server instance type) spawns with a CTS agent 107 that subscribes to a CTS Service and enables static cost metrics collection at the CTS metric database 110. Each CTS Agent 107 for each instance establishes metrics to be measured to determine cost units (e.g., cost per hour, storage, IOPS, etc.), and each transaction captures information about usage per transaction. Each transaction also captures cost attribution information (e.g., organization, user, feature, request ID, etc.).

Figure 2:
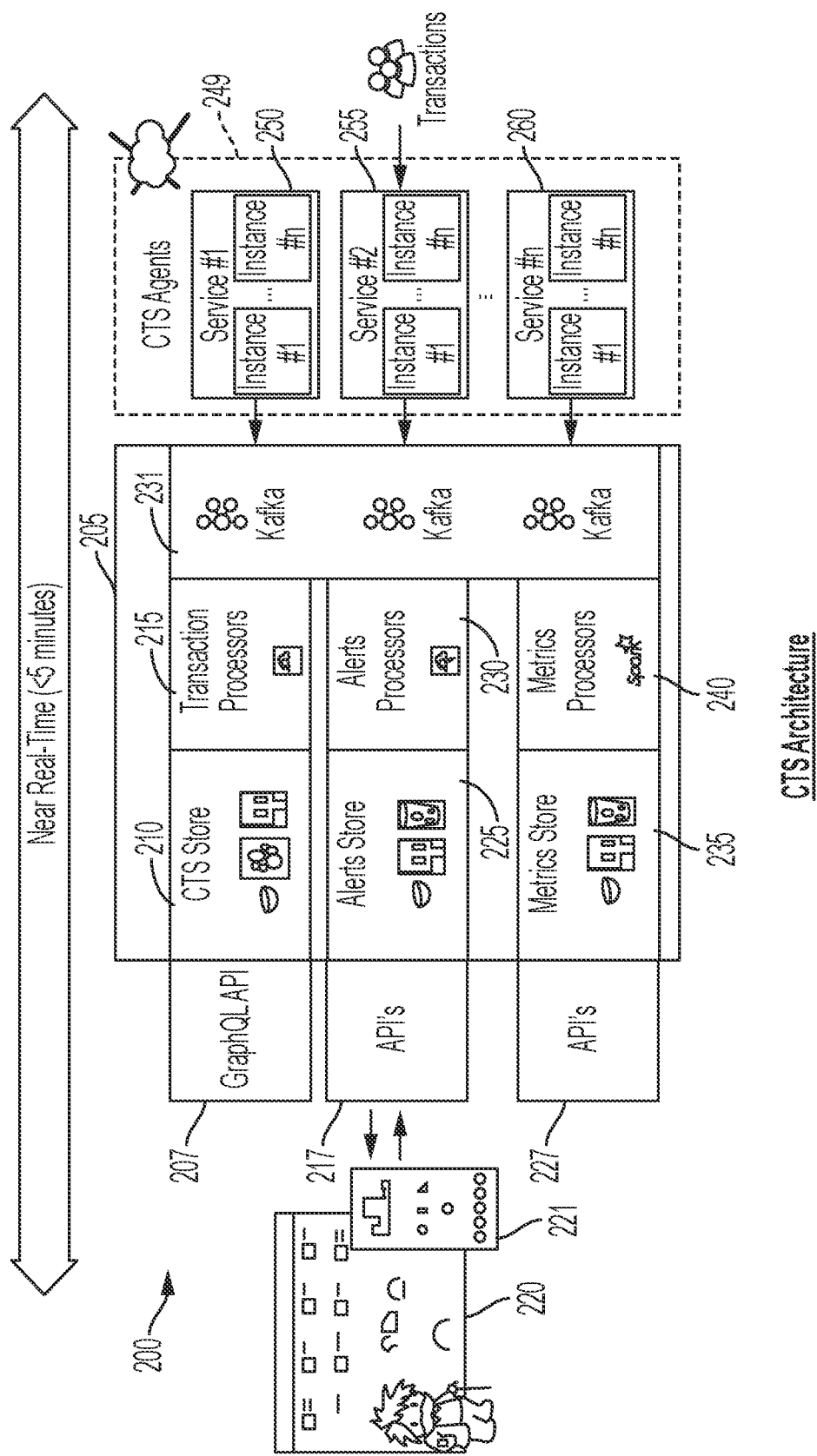
FIG. 2 is an exemplary diagram illustrating an architecture of a cost-to-serve service system in accordance with an embodiment.

FIG. 2 is an exemplary diagram of a CTS architecture in accordance with an exemplary embodiment. The CTS framework 200 provides a configuration for a Cost-To-Serve service, which abstracts determining the actual cost to serve at each runtime. The CTS framework 200 enables an analysis of cost attribution across multiple customers and multiple applications, services, and features without requiring any manual intervention. In FIG. 2, a near real-time session is configured with a CTS analytics display 220 that is displayed on a client device 221, such as a smartphone or similar mobile device. In other embodiments, the CTS analytics display 220 can be configured for display on a desktop type device. The CTS analytics display provides a CTS metric analysis of cost and cost attribution analytics for cloud applications in a public cloud via analytics dashboards.

The CTS analytics display 220 receives data from a CTS service 205, which includes components or a graphic APIs 207 for a CTS store 210, the transaction processor 215, APIs 217 for alerts stores 225, alert processors 230, and APIs 227 for metric stores 235 with CTS metric processors 240. The CTS metrics processors 240 aggregate metrics from the CTS Store 210 for cost attribution (organization, user, persona, cloud, feature, etc.).

The transaction processor 215, the alert processor 230, and the CTS metrics processor 240 are configured to interface with a distributed streaming platform 231. In this case, the distributed streaming platform 231 is an APACHE® KAFKA® platform for processing and assessing events in real-time from each of the CTS agents 249. The CTS agents 249 include service #1 (250), service #2 (255) to Service #n (260). The CTS agents 249 are distributed to each resource to monitor and send data of instances 1 to N from each resource.

Figure 3:
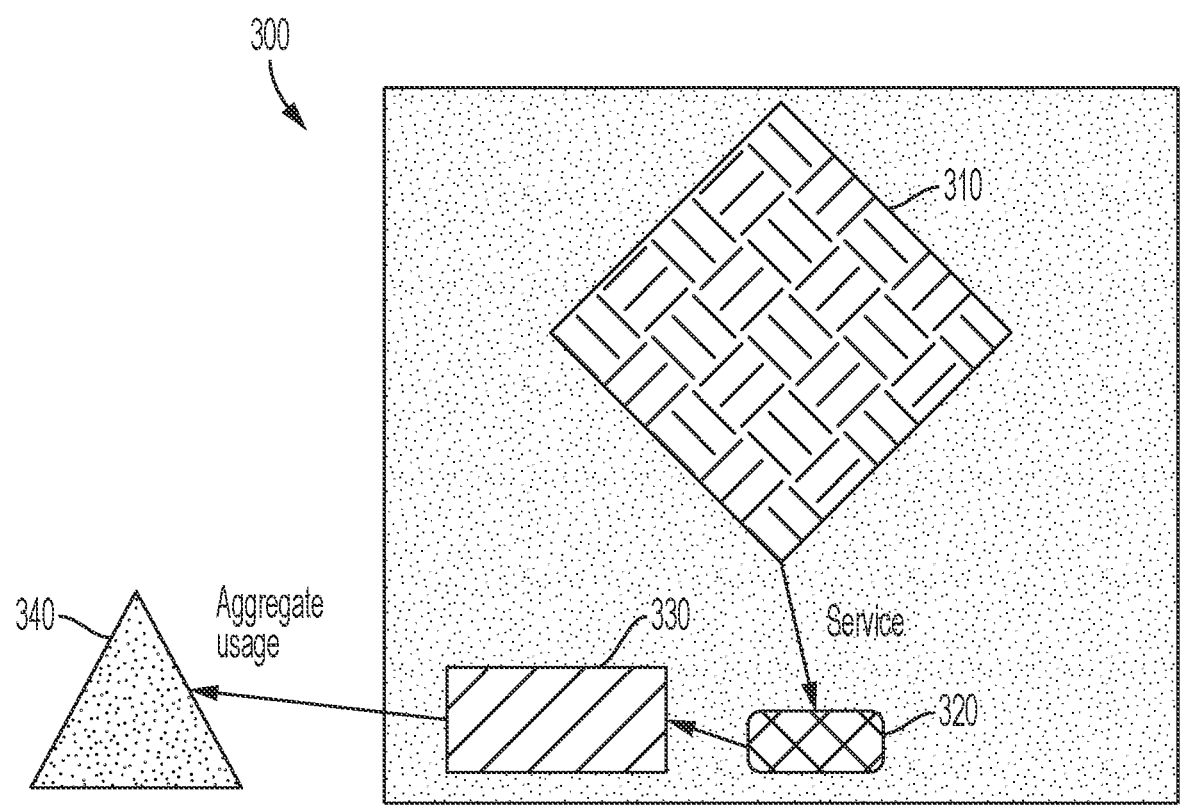
FIG. 3 is an exemplary diagram of automated real-time cost measurement and monitoring system for measuring the cost attributions of cloud applications in accordance with an embodiment.

FIG. 3 is an exemplary diagram of an automated real-time cost measurement system for measuring costs and cost attribution of the cloud applications configured in a pod/cloud in accordance with an embodiment. The system 300 includes a configured pod 310 for a CTS service 320 spawning CTS agent for each instance. That is for each server instance type, spawns with a CTS agent are each configured to subscribe to the CTS service 320 for static cost metric collection. For each CTS agent transaction, a publishing module 330 publishes each CTS agent instance and establishes metrics to be measured to determine cost units (e.g., cost per hour, storage, IOPS, etc.). Further, from each transaction, the publishing module 330 captures information about usage per transaction. For each transaction, the publishing module 330 captures cost attribution information (e.g., organization, user, feature, request Id, etc.). The information is aggregated at a CTS service collector module 340 to generate various aggregate usages in different classifications for enabling aggregate cost attributions. The CTS service collector module 340 store every CTS agent and aggregates and publishes the transaction metrics to the CTS Service collector and collects all transactions and stores them in the CTS store.

Figure 4:
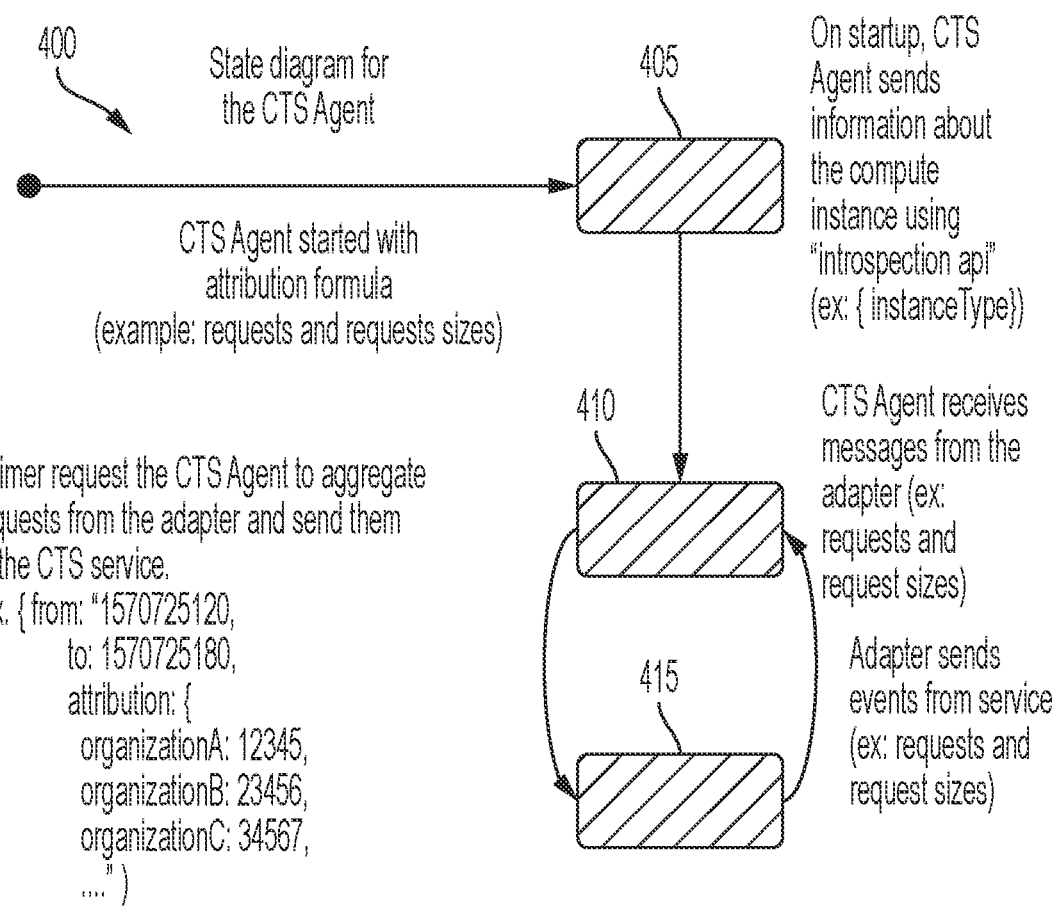
FIG. 4 is an exemplary state diagram of a first, second and third states of CTS agents in the CTS service in accordance with an embodiment.

FIG. 4 is an exemplary state diagram 400 for the CTS service in accordance with an embodiment. Initially, each CTS agent is configured with an attribution formula for each instance for processing at a first state 405. Next, on startup, at the first state 405, the CTS agent sends information about the computed instance using introspection API (e.g., an API configured as {instance Type: "machineType123", Os: "Linux"}. Next, at a second state 410, the CTS agent receives messages from the adapter (e.g., requests and request sizes), and the adapter sends events from the CTS service (e.g., requests and request size). Then at the third state 415, a timed request from a configured time associated with the CTS agent is executed to aggregate requests from the adapter (in a particular time slot) and to send the aggregated data to the CTS service. For example, the (e.g.: {from: 1570725120, to: 1570725180, attribution: {organization A: 12345, organization B: 23456, organization C:34567 . . . ). The CTS service (i.e., the CTS service collector) stores the aggregated data in the CTS store from each CTS agent and publishes the transaction metrics in the third state 415.

Figure 5:
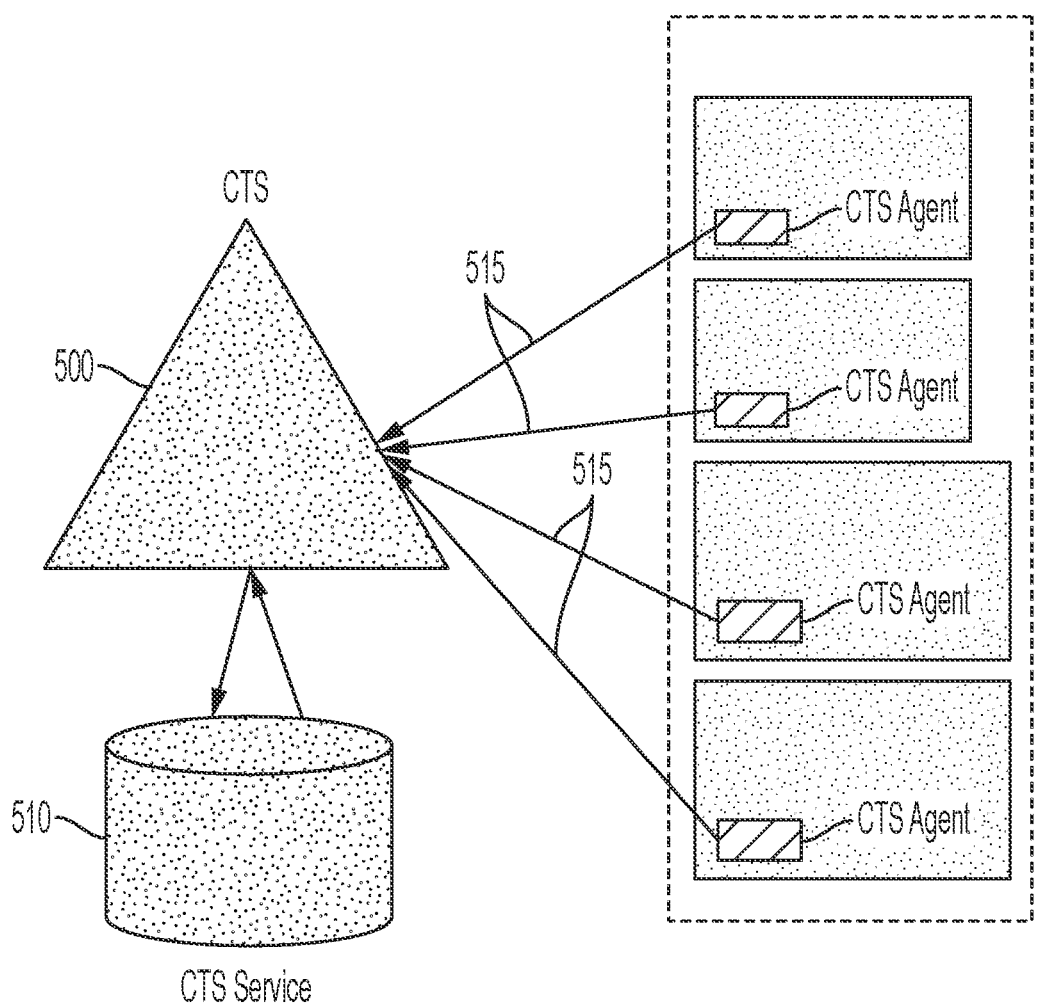
FIG. 5 is an exemplary diagram of a CTS service collector and CTS service in accordance with an embodiment.

FIG. 5. is an exemplary diagram of a CTS service collector and CTS service in accordance with an embodiment. The CTS service 500 receives agent startup messages and subsequent attribution information from each server type, where the CTS agents 515 are spawned to enable static cost metrics collection. Each CTS agent instance of CTS agent 515 establishes metrics to be measured to determine cost units (e.g., cost per hour, storage, IOPS, etc.), and each transaction captures information about usage per transaction. Each transaction also captures cost attribution information (e.g., organization, user, feature, request Id, etc.). Every CTS agent 515 aggregates and publishes transaction metrics to the CTS service storage 510 and collects all transactions and stores the metric data in a particular CTS store associated with each server. The CTS Service storage stores measurements of the total cost (near) real-time for each transaction based on the instance type and usage type (cost per unit).

Figure 6:
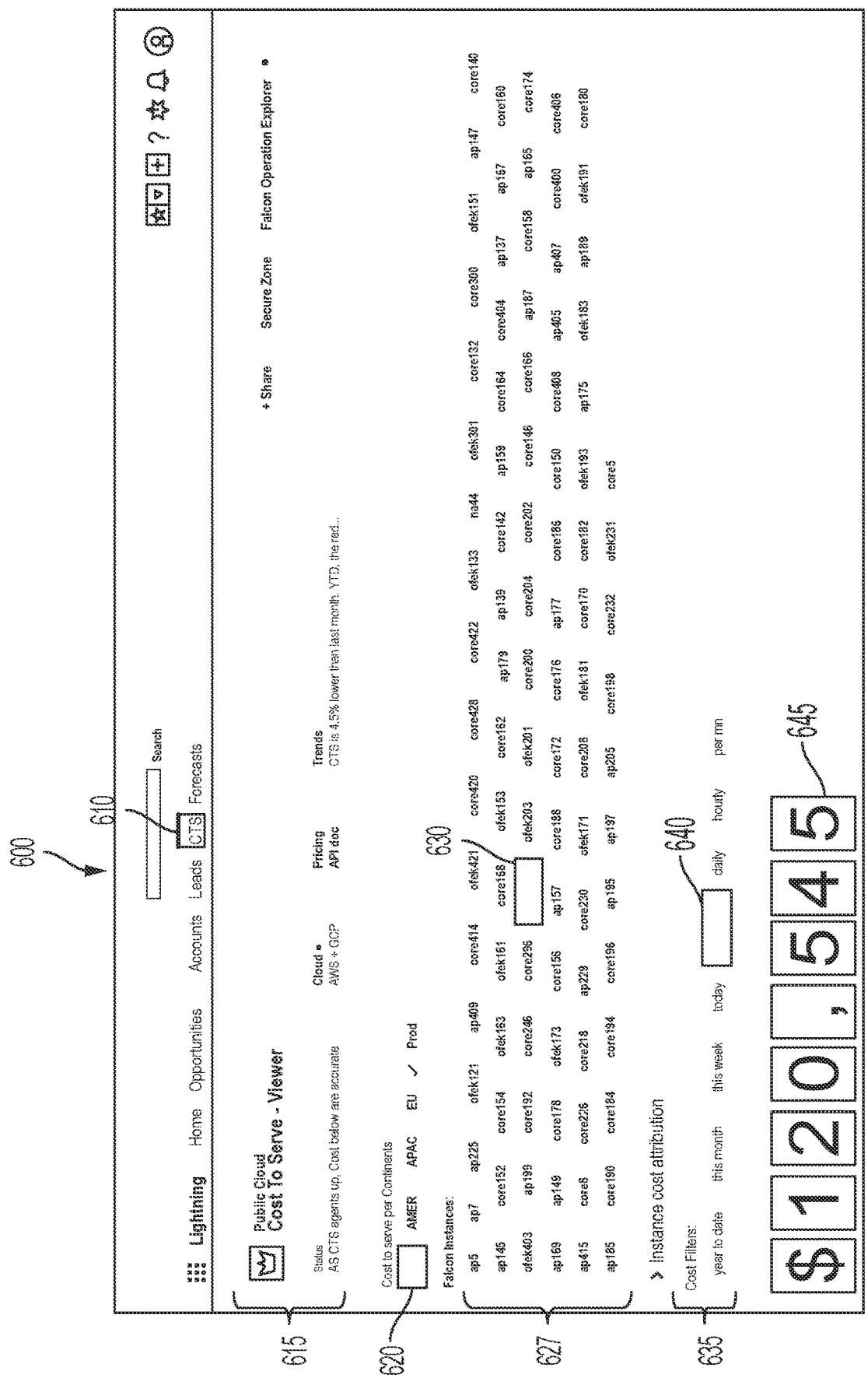
FIG. 6 is an exemplary screenshot of metrics and analytics of an exemplary method of a CTS service in accordance with an embodiment.

FIG. 6 illustrates a screenshot of CTS metrics in a display of a CTS viewer in accordance with an embodiment. In FIG. 6, the graphic user interface 600 displayed includes a selection tab 610 to select the CTS viewer 615. The CTS viewer 615 includes a status of all the CTS agents, selection of a particular cloud, related pricing documentation, and a description of the current cost trend. This displayed data is configurable as desired by the user. All the clouds 627 that are monitored are displayed with the selection of the "all" block 620. Further, an individual cloud 630 may be selected (i.e., in this case, "ap255"). Further, a cost filter 635 enables aggregated metric data of "year to date", "this month", "this week", "today", "monthly", "daily", "hourly", and "per minute". In this particular case, the "monthly" block 640 is selected, the "monthly" cost metric for the "ap255" cloud is displayed at "$120,545" at 645.

Figure 7:
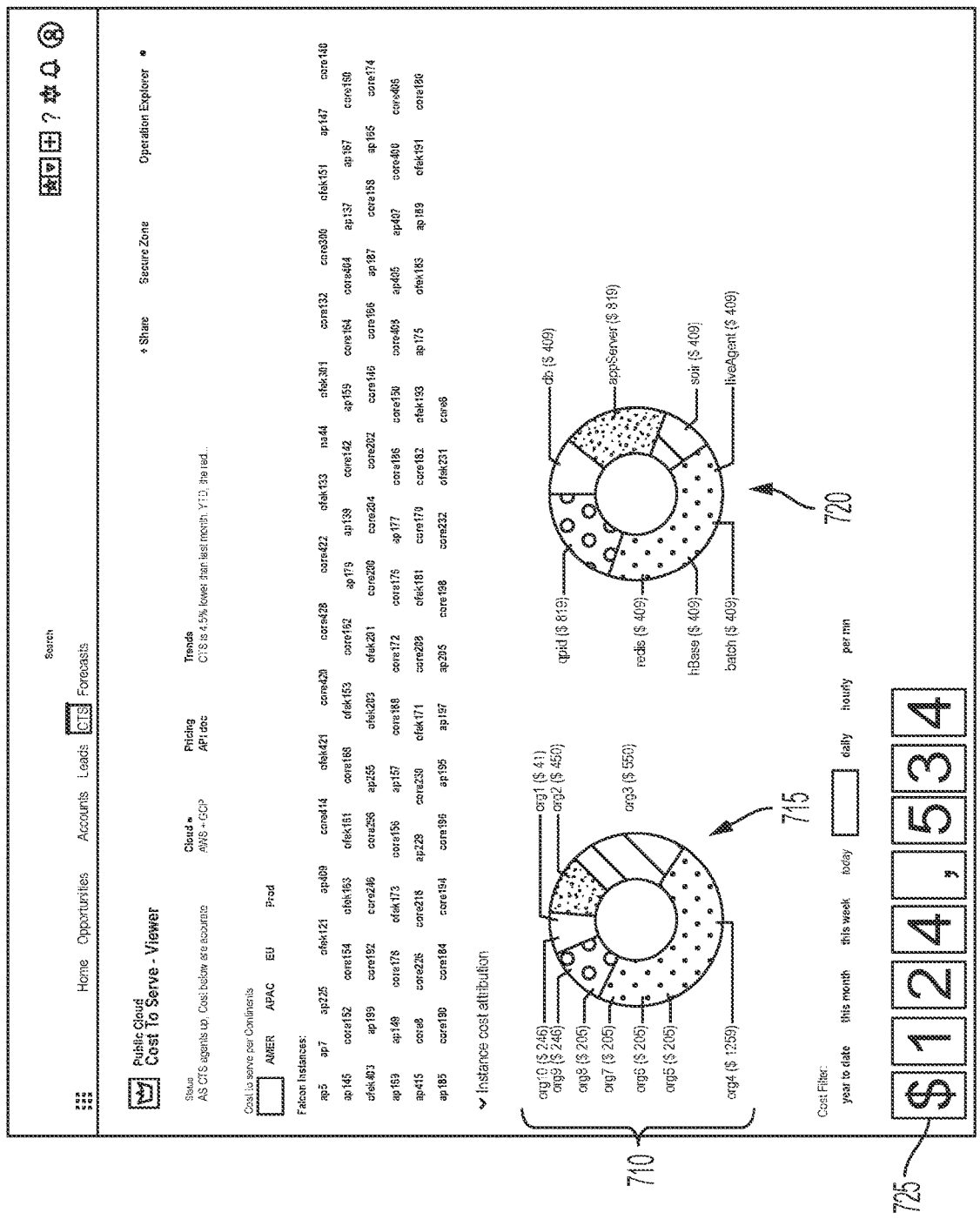
FIG. 7 is an exemplary screenshot of metrics and analytics of an exemplary method of a CTS service in accordance with an embodiment.

FIG. 7 illustrates another screenshot of CTS metric analytics with pie charts for displaying metric data in accordance with an embodiment. The graphic user interface 700 includes a section 710 of a particular cloud cost attribution. In this case, the "falcon" cloud cost attribution. In the pie chart 715, the cost attributions for each organization monthly are shown as parts of the pie chart 715. In pie chart 720, the monthly cost attribution for each of the resources in a particular cloud, pod, etc. are shown. In this instance, the total monthly cost attribution of the "falcon" cloud is $124,534 at 725.

Figure 8:
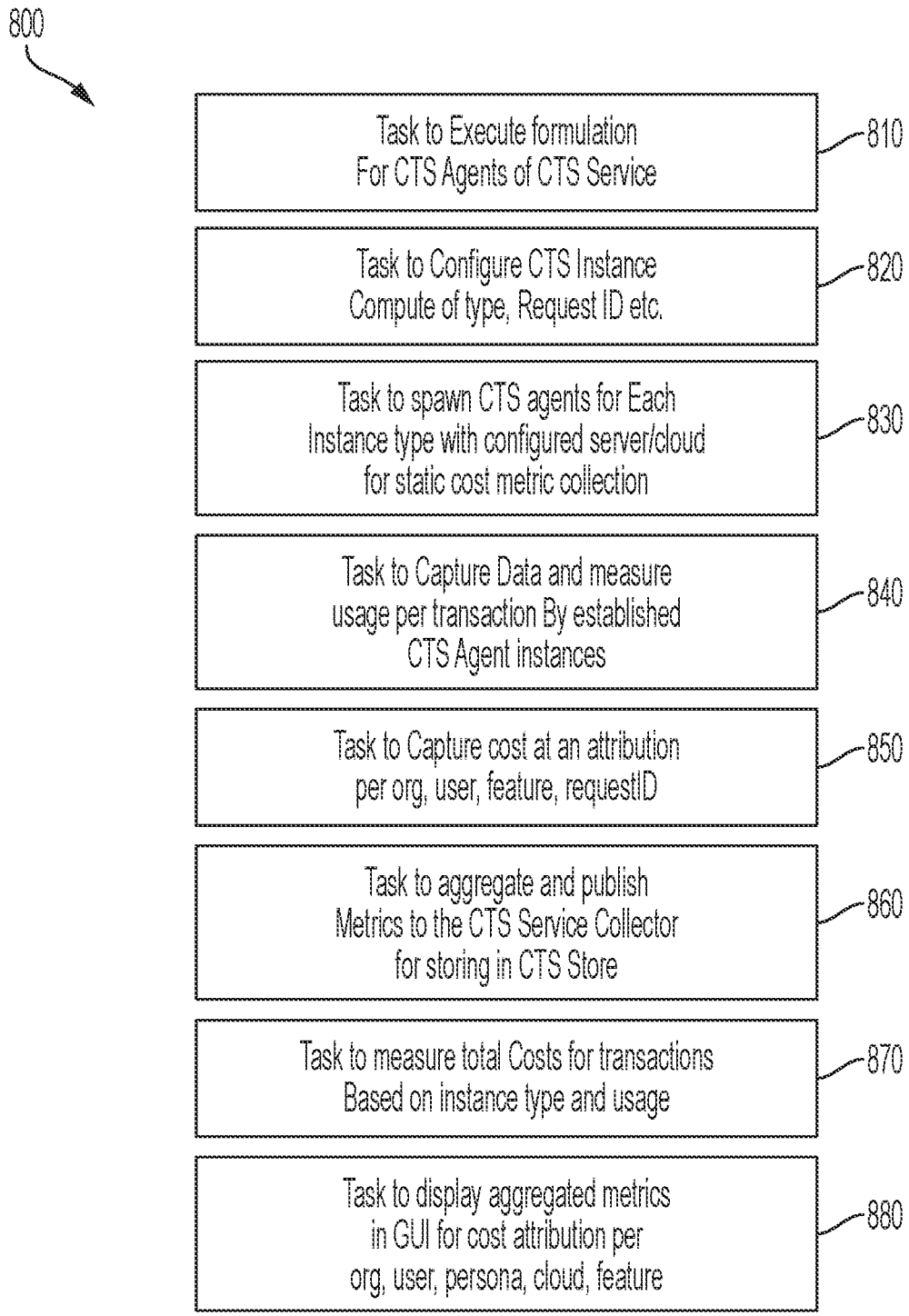
FIG. 8 is an exemplary flowchart of the CTS service in accordance with an embodiment.

FIG. 8 illustrates an exemplary flow chart of the CTS service in accordance with an embodiment. In FIG. 8, the flowchart 800 at task 810 executes formulations for CTS agents of a CTS service. At task 820, configures CTS instance computes of types, request ID, etc . . . . At task 830, spawns CTS agents for each instance type with a server or cloud for cost metric collection. At task 840, captures data and measure usage per transaction by established CTS agent instances. At task 850, captures cost attributions per organization, user, feature, cloud, request ID, etc . . . . At task 860, aggregates and publishes metrics to the CTS service collector for storing in the CTS store. At task 870, measures total costs for transactions of instance type and usage. At task 880, displays aggregated data metrics in a graphic user interface per user selections for certain cost attributions such as for an organization, user, persona, feature etc.

Figure 9:
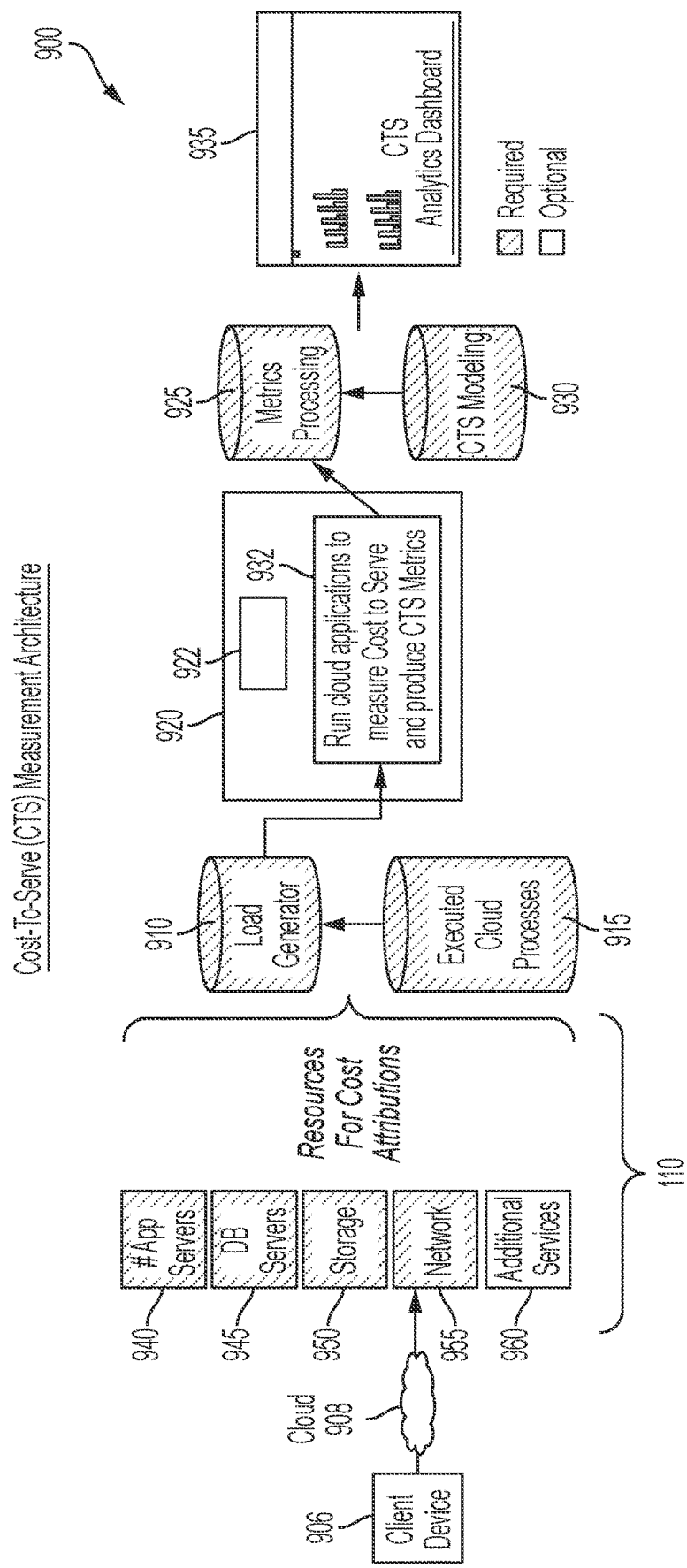
FIG. 9 is an exemplary diagram of a computing system capable of measuring cost attributions of a CTS service in accordance with an embodiment.

With reference to FIG. 9, FIG. 9 depicts an exemplary embodiment of a computing system 900 capable of measuring cost to service with monitoring performance and testing loads for a server configuration 910 associated with a client device 906. The client device 906 retrieving or otherwise accessing a computer file provided by or on the server configuration 910 communicatively coupled to the client device 106 over a communications network 908 with cloud cost to service attributes for measurement. The communications network 908 may be realized as any sort or combination of wired and wireless computer network, a cellular network, a mobile broadband network, a radio network, the Internet, or the like. It should be noted that FIG. 9 is a simplified representation of a computing system 900 for purposes of explanation and is not intended to be limiting. For example, in practice, multiple instances of client devices 906 communicating on the network 908 may be present, with any number of instances of applications being provided by the server 910 (or cloud) to various instances of client devices 906. Additionally, practical implementations may include multiple instances of the server 910 (or cloud) configured with app servers 940, database servers 945, storage 950, network 955, and additional services 960 which, in turn may reside behind or rely on one or more load balancers by a load generator 910 to manage resource utilization, as will be appreciated in the art. Additionally, a processing system 920 runs loads 915 to measure and produce the CTS metrics 932 as instructed by instructions in memory 922. The processing system 920 uses a processor configured for metric processing 925 and implements various CTS models 930. The results are displayed by an analysis engine 935 that, via a user interface, can display multiple CTS analytics in a dashboard.

The server 910 generally represents a computing device, computing system, or another combination of processing logic, circuitry, hardware, and/or other components configured to support the processes, tasks, operations, and/or functions described herein. In this regard, the server 910 includes a processing system 920, which may be implemented using any suitable processing system and/or device, such as, for example, one or more processors, central processing units (CPUs), controllers, microprocessors, microcontrollers, processing cores and/or other hardware computing resources configured to support the operation of the processing system 920 described herein.

The processing system 920 may include or otherwise access a data storage element or memory 922 capable of storing programming instructions for execution by the processing system 920, that, when read and executed, cause processing system 920 to support the processes described herein. Depending on the embodiment, the memory 922 may be realized as random-access memory (RAM), read-only memory (ROM), flash memory, magnetic or optical mass storage, or any other suitable non-transitory short or long-term data storage or other computer-readable media, and/or any suitable combination thereof. In one or more embodiments, the programming instructions cause the processing system 920 to create, generate, or otherwise facilitate an application platform that is capable of supporting, producing, or otherwise providing instances of a virtual application at run-time (or "on-demand") based at least in part upon code and other data that is stored or otherwise maintained in memory 922. In exemplary embodiments, the programming instructions also cause the processing system 920 to create, generate, or otherwise facilitate a CTS monitoring application program interface (API) that supports tracking, measuring and otherwise monitoring CTS metrics associated with the server configuration 910; for example, monitoring instances and instance types, usage, aggregating cost metrics between the configured resources of the app servers 940 providing web pages or other files, data, and/or information to the client device 906 as well as requests and sends executed between the app server 940, database servers 945, the storage 950, the network 955 and the additional services 960. Depending on the embodiment, the CTS monitoring API can be integrated with or otherwise incorporated as part of a virtual application or be realized as a separate or standalone component that is capable of interacting with the client devices 906, the server configuration 910 resources and any independent virtual applications.

The analysis engine 935 analyses each of the instances captured by the CTS agent. As an exemplary embodiment, for each combination of the above, the analysis engine 935 automatically analyses and trends each CTS metrics obtained. The analysis engine 935 also provides drill-down analysis, reporting, and dashboards for each of the combination of app server, database server, storage, etc. In an exemplary embodiment, the analysis engine 935 provides a breakdown of total CTS metrics and usage based on different attributes.

The client device 906 generally represents an electronic device coupled to the network 908 that may be utilized by a user to access the application platform on the app server 940 of the server 910 to thereby access instances of virtual applications supported by the app server 940 and/or retrieve cost and usage data from the database server 945 (or data store) via the network 908. In practice, client device 906 can be realized as any sort of personal computer, mobile telephone, tablet, or other network-enabled electronic devices. In exemplary embodiments, the client device 906 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 906.

Figure 10:
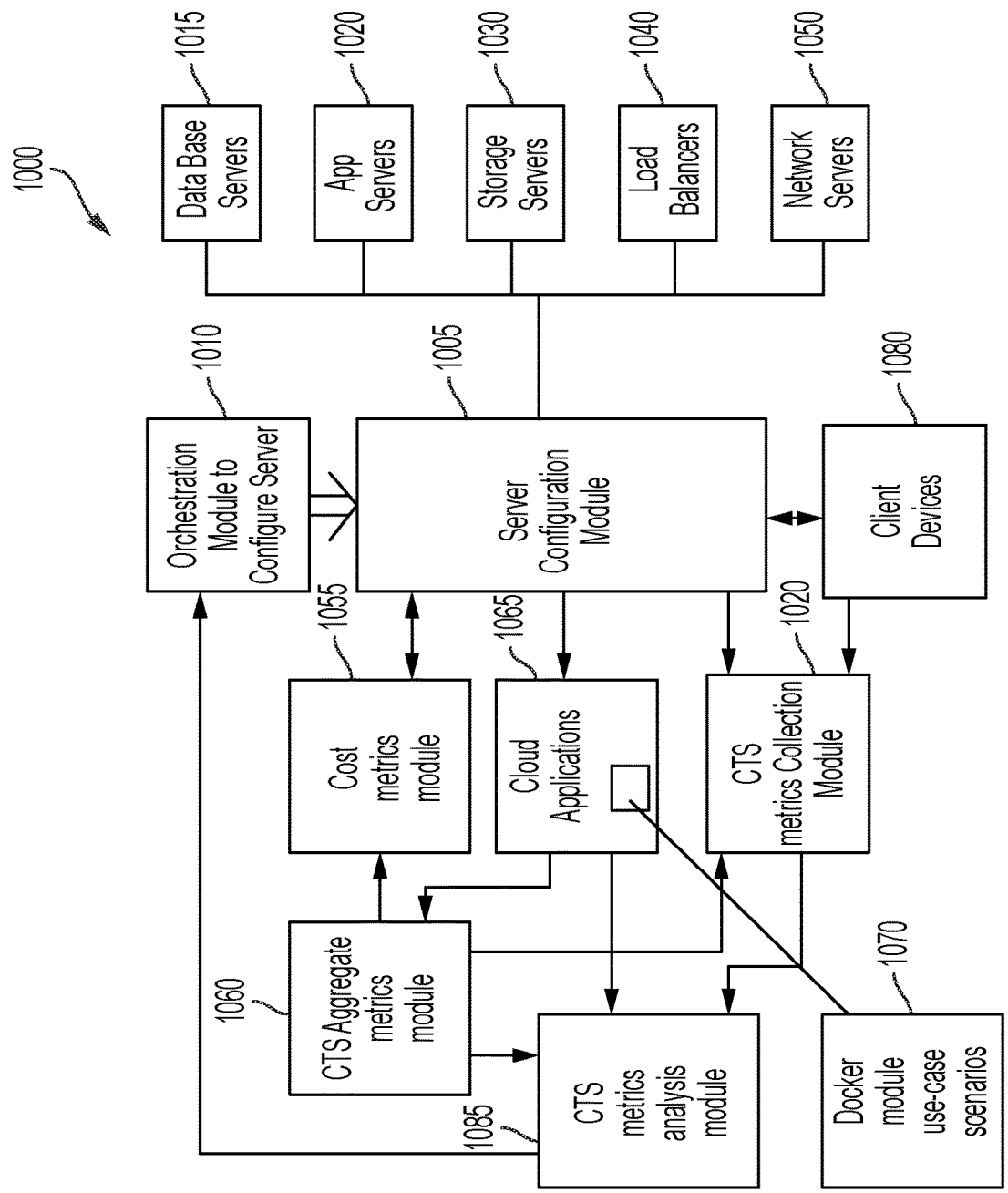
FIG. 10 is an exemplary diagram of a CTS service for measuring cost attributions in accordance with an embodiment.

With reference to FIG. 10, FIG. 10 is a functional diagram illustrating CTS service integrated with an automated system for measuring the cost for use-case scenario cost analysis of cloud applications in accordance with an embodiment. In FIG. 10, the cost measurement system 1000 measures the cost of cloud applications using application use-case scenarios by implementing a set of a process configured modules to perform metric analysis, load tests, cost metrics, server configuration, and metric collections of various use case scenarios. In FIG. 10, a server configuration is generated for a server configuration module 1005 by an orchestration module 1010. The orchestration module 1010 receives input data that has been analyzed by a cost metric analysis module 1085 to put forth a particular arrangement to configure the server. That is, configuration data from the orchestration module 1010 based on the cost metrics analysis is generated in real-time for a set of resources selected by the orchestration module 1010 and implemented by the server configuration module 1005. The orchestration module 1010 orchestrates a load from a plurality of use-case scenarios with a desired concurrency of simulated users to determine a particular server configuration for implementation by the server configuration module 1005. For example, the server configuration module 1005 selects a quantity and types of database servers 1015, app servers 1020, storage servers 1030, load balancers 1040 and network servers 1050 to a desired server configuration which can be modified based in part on results from a load module 1065 with sub-modules 1070 to configure plurality of docker containers each running a single instance of dockerized. Docker works by providing a standard way to run your code. Docker is an operating system for containers. Similar to how a virtual machine virtualizes (removes the need to manage directly) server hardware, containers virtualize the operating system of a server. Docker is installed on each server and provides simple commands you can use to build, start, or stop containers. The cost metrics analysis module 1085 receives data from a post metric module 1060 to model cost metrics of the deployed server configuration from metrics data collected by the cost metrics collection module 1075 on the app servers 1020, database servers 1015, storage servers 1030, network servers 1050, load balancers 1040 and the client devices 1080. The post metrics module 1060 generates metrics to the cost metrics module 1055 of the CTS service from data from the load module 1065 by post-process metrics analysis across the load duration to provide cost metrics.

The cost metric analysis module 1085 analyzes the cost metrics received from the post metric module 1060 to determine areas of costs.

The app server 1020 can be configured as a platform as a service ("Paas") that provides a host of features to develop, test, deploy, host, and maintain-apps in the same integrated development environment of the app platform. Additionally, the app server 1020 may be part of a multi-tenant architecture where multiple concurrent users utilize the same development apps installed on the app platform. Also, by utilizing the multi-tenant architecture in conjunction with the app platform integration with web services and databases via common standards and communication tools can be configured. As an example, SALESFORCE SERVICECLOUD® is an app platform residing on the app server that may host all the varying services needed to fulfill the app development process. The SALESFORCE SERVICECLOUD®, as an example, may provide web-based user interface creation tools to help to create, modify, test, and deploy different UI scenarios.

The app platform includes apps relating to APIs and objects. The app platform may include other apps in communication for accessing a multi-tenant database as an example, in a multi-tenant database system.

Additionally, a call or request is from an app server controller by an action initiated by a client controller. In a client controller, a callback is set, which is called after the server action is completed.

Additionally, the app platform has access to other databases for information retrieval and includes a database where cost metric data may be stored. The local database may be part of the multi-tenant database architecture allowing for communication with the multi-tenant database. In addition, the app platform can access a multi-tenant database, which is part of the multi-tenant architecture. The multi-tenant database allows for enterprise customer access, and the app platform may be given access to the multi-tenant database dependent upon different factors such as an associated session ID associated.

Figure 11:
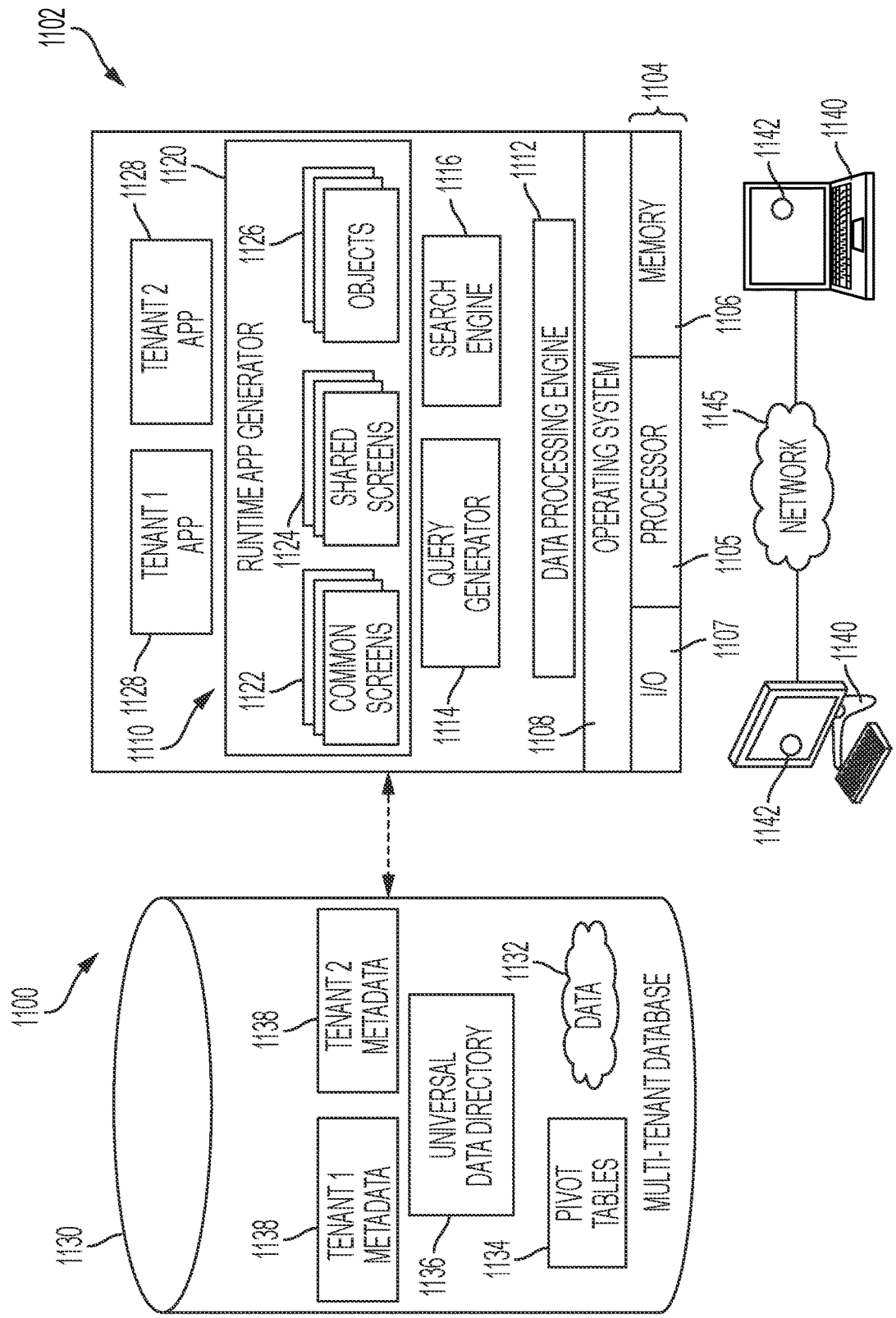
FIG. 11 is an exemplary schematic block diagram of a multi-tenant computing environment of an exemplary method of a CTS service in accordance with an embodiment.

With reference to FIG. 11, FIG. 11 is a schematic block diagram of a multi-tenant computing environment in accordance with an embodiment. FIG. 11 is a schematic block diagram of a multi-tenant computing environment for use in conjunction with the communication process of the object sharing of the mobile client and agent in accordance with an embodiment. A server may be shared between multiple tenants, organizations, or enterprises, referred to herein as a multi-tenant database. In the exemplary disclosure, video-chat data and services generated by are provided via a network 1145 to any number of tenant devices 1140, such as desktops, laptops, tablets, smartphones, Google Glass™, and any other computing device implemented in an automobile, aircraft, television, or other business or consumer electronic device or system, including web tenants.

Each app 1128 is suitably generated at run-time (or on-demand) using a common type of app platform 1110 that securely provides access to the data 1132 in the multi-tenant database 1130 for each of the various tenant organizations subscribing to the service cloud 1100. In accordance with one non-limiting example, the service cloud 1100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to a common subset of the data within the multi-tenant database 1130. In this regard, each tenant includes one or more users and/or groups associated with, authorized by, or otherwise belonging to that respective tenant. Stated another way, each respective user within the multi-tenant system of the service cloud 1100 is associated with, assigned to, or otherwise belongs to a particular one of the plurality of enterprises supported by the system of the service cloud 1100.

Each enterprise tenant may represent a company, corporate department, business or legal organization, and/or any other entities that maintain data for particular sets of users (such as their respective employees or customers) within the multi-tenant system of the service cloud 1100. Although multiple tenants may share access to the server 1102 and the multi-tenant database 1130, the particular data and services provided from the server 1102 to each tenant can be securely isolated from those provided to other tenants. The multi-tenant architecture, therefore, allows different sets of users to share functionality and hardware resources without necessarily sharing any of the data 1132 belonging to or otherwise associated with other organizations.

The multi-tenant database 1130 may be a repository or other data storage system capable of storing and managing the data 1132 associated with any number of tenant organizations. The multi-tenant database 1130 may be implemented using conventional database server hardware. In various embodiments, the multi-tenant database 1130 shares the processing hardware 1104 with the server 1102. In other embodiments, the multi-tenant database 1130 is implemented using separate physical and/or virtual database server hardware that communicates with the server 1102 to perform the various functions described herein.

In an exemplary embodiment, the multi-tenant database 1130 includes a database management system or other equivalent software capable of determining an optimal query plan for retrieving and providing a particular subset of the data 1132 to an instance of app (or virtual app) 1128 in response to a query initiated or otherwise provided by an app 1128, as described in greater detail below. The multi-tenant database 1130 may alternatively be referred to herein as an on-demand database, in that the multi-tenant database 1130 provides (or is available to provide) data at run-time to on-demand virtual apps 1128 generated by the app platform 1110, as described in greater detail below.

In practice, the data 1132 may be organized and formatted in any manner to support the app platform 1110. In various embodiments, the data 1132 is suitably organized into a relatively small number of large data tables to maintain a semi-amorphous "heap"-type format. The data 1132 can then be organized as needed for a particular virtual app 1128. In various embodiments, conventional data relationships are established using any number of pivot tables 1134 that establish indexing, uniqueness, relationships between entities, and/or other aspects of conventional database organization as desired. Further data manipulation and report formatting are generally performed at run-time using a variety of metadata constructs. Metadata within a universal data directory (UDD) 1136, for example, can be used to describe any number of forms, reports, workflows, user access privileges, business logic, and other constructs that are common to multiple tenants.

Tenant-specific formatting, functions, and other constructs may be maintained as tenant-specific metadata 1138 for each tenant, as desired. Rather than forcing the data 1132 into an inflexible global structure that is common to all tenants and apps, the multi-tenant database 1130 is organized to be relatively amorphous, with the pivot tables 1134 and the metadata 1138 providing additional structure on an as-needed basis. To that end, the app platform 1110 suitably uses the pivot tables 1134 and/or the metadata 1138 to generate "virtual" components of the virtual apps 1128 to obtain, process logically, and present the relatively amorphous data from the multi-tenant database 1130.

The server 1102 may be implemented using one or more actual and/or virtual computing systems that collectively provide the dynamic type of app platform 1110 for generating the virtual apps 1128. For example, the server 1102 may be implemented using a cluster of actual and/or virtual servers operating in conjunction with each other, typically in association with conventional network communications, cluster management, load balancing and other features as appropriate. The server 1102 operates with any sort of processing hardware 1104, which is conventional, such as a processor 1105, memory 1106, input/output features 1107, and the like. The input/output features 1107 generally represent the interface(s) to networks (e.g., to the network 1145, or any other local area, wide area or other networks), mass storage, display devices, data entry devices and/or the like.

The processor 1105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1106 represents any non-transitory short- or long-term storage or other computer-readable media capable of storing programming instructions for execution on the processor 1105, including any sort of random-access memory (RAM), read-only memory (ROM), flash memory, magnetic or optical mass storage, and/or the like. The computer-executable programming instructions, when read and executed by the server 1102 and/or processor 1105, cause the server 1102 and/or processor 1105 to create, generate, or otherwise facilitate the app platform 1110 and/or virtual apps 1128 and perform one or more additional tasks, operations, functions, and/or processes described herein. It should be noted that the memory 1106 represents one suitable implementation of such computer-readable media, and alternatively or additionally, the server 1102 could receive and cooperate with external computer-readable media that is realized as a portable or mobile component or platform, e.g., a portable hard drive, a USB flash drive, an optical disc, or the like.

The app platform 1110 is any sort of software app or other data processing engine that generates the virtual apps 1128 that provide data and/or services to the tenant devices 1140. In a typical embodiment, the app platform 1110 gains access to processing resources, communications interface, and other features of the processing hardware 1104 using any sort of conventional or proprietary operating system 1108. The virtual apps 1128 are typically generated at run-time in response to input received from the tenant devices 1140. For the illustrated embodiment, the app platform 1110 includes a bulk data processing engine 1112, a query generator 1114, a search engine 1116 that provides text indexing and other search functionality, and a runtime app generator 1120. Each of these features may be implemented as a separate process or other modules, and many equivalent embodiments could include different and/or additional features, components, or other modules as desired.

The runtime app generator 1120 dynamically builds and executes the virtual apps 1128 in response to specific requests received from the tenant devices 1140. The virtual apps 1128 are typically constructed in accordance with the tenant-specific metadata 1138, which describes the particular tables, reports, interfaces, and/or other features of the particular app 1128. In various embodiments, each virtual app 1128 generates dynamic web content that can be served to a browser or other tenant program 1142 associated with its tenant device 1140, as appropriate.

The runtime app generator 1120 suitably interacts with the query generator 1114 to efficiently obtain data 1132 from the multi-tenant database 1130 as needed in response to input queries initiated or otherwise provided by users of the tenant devices 1140. In a typical embodiment, the query generator 1114 considers the identity of the user requesting a particular function (along with the user's associated tenant), and then builds and executes queries to the multi-tenant database 1130 using system-wide metadata 1136, tenant-specific metadata, pivot tables 1134, and/or any other available resources. The query generator 1114 in this example, therefore, maintains the security of the common database by ensuring that queries are consistent with access privileges granted to the user and/or tenant that initiated the request.

With continued reference to FIG. 11, the bulk data processing engine 1112 performs bulk processing operations on the data 1132, such as uploads or downloads, updates, online transaction processing, and/or the like. In many embodiments, less urgent bulk processing of the data 1132 can be scheduled to occur as processing resources become available, thereby giving priority to more urgent data processing by the query generator 1114, the search engine 1116, the virtual apps 1128, etc.

In exemplary embodiments, the app platform 1110 is utilized to create and/or generate data-driven virtual apps 1128 for the tenants that they support. Such virtual apps 1128 may make use of interface features such as custom (or tenant-specific) screens 1124, standard (or universal) screens 1122, or the like. Any number of custom and/or standard objects 1126 may also be available for integration into tenant-developed virtual apps 1128. As used herein, "custom" should be understood as meaning that a respective object or app is tenant-specific (e.g., only available to users associated with a particular tenant in the multi-tenant system) or user-specific (e.g., only available to a particular subset of users within the multi-tenant system), whereas "standard" or "universal" apps or objects are available across multiple tenants in the multi-tenant system.

The data 1132 associated with each virtual app 1128 is provided to the multi-tenant database 1130, as appropriate, and stored until it is requested or is otherwise needed, along with the metadata 1138 that describes the particular features (e.g., reports, tables, functions, objects, fields, formulas, code, etc.) of that particular virtual app 1128. For example, a virtual app 1128 may include a number of objects 1126 accessible to a tenant, wherein for each object 1126 accessible to the tenant, information pertaining to its object type along with values for various fields associated with that respective object type are maintained as metadata 1138 in the multi-tenant database 1130. In this regard, the object type defines the structure (e.g., the formatting, functions, and other constructs) of each respective object 1126 and the various fields associated therewith.

Still referring to FIG. 11, the data and services provided by the server 1102 can be retrieved using any sort of personal computer, mobile telephone, tablet or other network-enabled tenant device 1140 on the network 1145. In an exemplary embodiment, the tenant device 1140 includes a display device, such as a monitor, screen, or another conventional electronic display capable of graphically presenting data and/or information retrieved from the multi-tenant database 1130, as described in greater detail below.

Typically, the user operates a conventional browser app or other tenant program 1142 executed by the tenant device 1140 to contact the server 1102 via the network 1145 using a networking protocol, such as the hypertext transport protocol (HTTP) or the like. The user typically authenticates his or her identity to the server 1102 to obtain a session identifier ("Session ID") that identifies the user in subsequent communications with the server 1102. When the identified user requests access to a virtual app 1128, the runtime app generator 1120 suitably creates the app at run time based upon the metadata 1138, as appropriate. However, if a user chooses to manually upload an updated file (through either the web-based user interface or through an API), it will also be shared automatically with all of the users/devices that are designated for sharing.

As noted above, the virtual app 1128 may contain Java, ActiveX, or other content that can be presented using conventional tenant software running on the tenant device 1140; other embodiments may simply provide dynamic web or other content that can be presented and viewed by the user, as desired. As described in greater detail below, the query generator 1114 suitably obtains the requested subsets of data 1132 from the multi-tenant database 1130 as needed to populate the tables, reports or other features of the particular virtual app 1128. In various embodiments, app 1128 embodies the functionality of an interactive performance review template linked to a database of performance and testing metrics, as described below in connection with FIGS. 1-11.

In various exemplary embodiments, a cost-to-serve (CTS) system is implementing for a CTS service to measure cost attributions of cloud applications and to display aggregated cost metrics in real-time, which includes: a plurality of CTS agent spawned across a plurality of resources to capture a set of instances associated with the plurality of resources wherein the set of instances includes an instance type and usage type. Also, a CTS agent transaction module to publish a set of metrics established by the CTS agent for each instance and usage type. A CTS service collector module to aggregate from each CTS agent, one or more instances from the set of instances to generate transaction metrics at the CTS Service collector of collected transactions based on the aggregated instances and for storing in a CTS store. A CTS measurement service module for measuring a total cost for each selected transaction stored at the CTS store based on a cost per unit. A CTS metrics processor module for aggregating a set of metrics related to the transactions in the CTS store to determine a set of cost attributions for at least a selected cloud. A CTS metrics analytic module to provide cost attribution analytics for cloud applications in the selected cloud in analytics display derived from the measurement of each cost unit and of cost attributions related to transaction data about the usage for each collected transaction. A CTS graphic user interfaces for receiving data from the CTS metrics analytic module to display cost units configured on a plurality of parameters on a cost per hour, cost per week, cost per month, and cost year to date basis.

The cost attribution data is associated with organizations, resources, and request IDs. The CTS agent configured in the first state with an attribution formula to send data about a compute instance to capture a set of instances associated with the plurality of resources. The CTS agent configured in a second state to receive requests via an adaptor for instructing the CTS service. The CTS agent configured in a third state to aggregate a set of requests based on a timer request for instructing the CTS service. A multi-tenant platform configured to communicate via a cloud with the CTS service to generate CTS metrics for each user or group of users connected to the multi-tenant platform with access to the CTS service. A CTS graphic user interfaces for receiving data from the CTS metrics analytic module to display analytic pie charts of cost attributions in accordance with a set at least comprising an organization and a resource.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The various tasks performed in connection with performance CTS metric monitoring may be performed by software, hardware, firmware, or any combination thereof. For illustrative purposes, the following description of object capture, shared display, and process may refer to elements mentioned above in connection with FIGS. 1-11. In practice, portions of the process of FIGS. 1-11 may be performed by different elements of the described system, e.g., mobile clients, agents, in-app apps, etc. It should be appreciated that process of FIGS. 1-11 may include any number of additional or alternative tasks, the tasks are shown in FIGS. 1-11 need not be performed in the illustrated order, and process of the FIGS. 1-11 may be incorporated into a more comprehensive procedure or process having additional functionality not described in detail herein. Moreover, one or more of the tasks shown in FIGS. 1-11 could be omitted from an embodiment of the process shown in FIGS. 1-11 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A cost-to-serve (CTS) system comprising:
   a processor hosted at a cloud server is configured to:
   spawn a plurality of CTS agents across a plurality of resources of a cloud network to capture information from a set of instances associated with usage of at least one resource of the network wherein resource instance information is identified by executing an introspection application programming interface (API) by a CTS agent to identify an instance type and usage type;
publish a set of metrics established by at least one CTS agent identified based on the instance type and the usage type;
aggregate information captured by CTS agents spawned about the cloud network to generate transactional metrics of CTS service transactions based on aggregated instances identified by the instance type and the usage type;
determine a total cost for CTS service transactions identified by the instance type and the usage type and a set of costs based on transactional metrics, and for storing in a CTS store hosted at the cloud server;
display cost attribution analytics for cloud applications in the cloud network in an analytics display by measurement of each cost unit and of cost attributions related to the service transactions about the usage type for each collected transaction; and
execute the CTS agent in a first state with an attribution formula to send data about a compute instance to capture the set of instances associated with the plurality of resources, in a second state to receive requests via an adaptor for instructing the CTS service, and in a third state to aggregate a set of requests based on a timer request for instructing the CTS service.

2. The system of claim 1, further comprising:
the processor further configured to:
display cost units configured on a plurality of parameters on a cost per hour, cost per week, cost per month, and cost year to date basis for the cloud network.

3. The system of claim 1, wherein the cost attribution data is associated with an identified feature and functionality, a particular request identifier (ID), a cloud data set for each transaction, and attributed costs for a respective set of cloud features and functions for the cloud network.

4. The system of claim 1, further comprising:
the processor further configured to:
operate with a multi-tenant platform to communicate via a cloud with the CTS service to generate CTS metrics for each user or group of users connected to the multi-tenant platform with access to the CTS service.

5. The system of claim 1, further comprising:
the processor further configured to:
implement a CTS graphic user interface to receive data about CTS metrics to display in analytic pie charts of cost attributions in accordance with a set at least comprising an organization and the associated plurality of resources.

6. A cost to serve (CTS) system comprising a computer program product tangibly embodied in a computer-readable storage device comprising computer instructions configurable to cause a processor to perform a cost to serve (CTS) service to measure cost attributions of cloud applications and to display aggregated cost metrics in real-time,
wherein the processor is caused by the computer instructions to:
spawn a plurality of CTS-agents across a plurality of resources to capture information from a set of instances associated with a set of resources of a selected network wherein resource instance data is identified by executing an introspection application programming interface (API) by a CTS agent to identify an instance type and a usage type associated with a resource in the selected network;
publish a set of metrics established by at least one CTS agent identified based on the instance type and the usage type;
aggregate information captured by the plurality of CTS agents about the selected network to generate transactional metrics of CTS service transactions based on aggregated instances identified by the instance type and the usage type;
determine a set of costs based on transactional metrics by at least one resource of the selected cloud network for storing at a CTS store;
determine a total cost for the CTS service based on the set of costs and related transactional costs of resources identified by the instance type and the usage type;
determine the total cost for a set of cost attributions for the selected network;
display cost attribution analytics for cloud applications associated with the cloud network on an analytics display based on measurements for each cost unit and cost attributions associated with transactions and collected related costs of resources used for the transaction wherein collected transaction costs are stored in the CTS store; and
execute the at least one CTS agent in a first state with an attribution formula associate with at least one cost attribution of the set of cost attributions to send data about a compute instance to capture the set of instances associated with the plurality of resources, in a second state to receive requests via an adaptor for instructing the CTS service, and in a third state to aggregate a set of requests based on a timer request for instructing the CTS service.

7. The CTS system of claim 6, further comprising:
wherein the processor is caused by computer instructions to:
display cost units based on received data of transactional metrics allocated to a plurality of parameters comprising a cost per hour, cost per week, cost per month, and cost year to date basis.

8. The CTS system of claim 6, wherein the cost attribution is associated with organizations, resources, and request IDs.

9. The CTS system of claim 6, further comprising:
wherein the processor is caused by computer instructions to:
implement a multi-tenant platform to communicate via a cloud with the CTS service to generate CTS metrics for each user or group of users connected to the multi-tenant platform with access to the CTS service.

10. A cost-to-serve (CTS) service system comprising:
at least one processor; and
at least one computer-readable storage device comprising instructions that when executed by the at least one processor causes execution of a method of implementing a CTS service to measure cost attributions of cloud applications and to display aggregated cost metrics in real-time by performing the steps comprising:
spawning a plurality of CTS agents across a plurality of resources to capture information from a set of instances associated with a set of resources of a selected network wherein resource instance data is identified by executing an introspection application programming interface (API) by a CTS agent to identify an instance type and a usage type associated with a resource in the selected network;
publishing a set of metrics established by at least one CTS agent identified based on the instance type and usage type;

aggregating information captured by the plurality of CTS agents about the selected network to generate transactional metrics of CTS service transactions based on aggregated instances identified by the instance type and the usage type;

determining a set of costs based on transactional metrics by at least one resource of the selected cloud network for storing at a CTS store;

determining a total cost for the CTS service based on the set of costs and related transactional costs of resources identified by the instance type and the usage type;

determining the total cost for a set of cost attributions for the selected network;

displaying cost attribution analytics for cloud applications associated with the cloud network on an analytics display based on measurements for each cost unit and cost attributions associated with transactions and collected related costs of resources used for the transaction wherein the collected transaction costs are stored in the CTS store;

executing the CTS agent in a first state with an attribution formula for sending data about a compute instance to capture a set of instances associated with the plurality of resources, in a second state to receive requests via an adaptor for instructing the CTS service, and in a third state to aggregate a set of requests based on a timer request for instructing the CTS service; and implementing a multi-tenant platform to communicate via a cloud with the CTS service to generate CTS metrics for each user or group of users connected to the multi-tenant platform with access to the CTS service.

11. The system of claim 10, further performing the step comprising:

displaying cost units configured on a plurality of parameters of a cost per hour, cost per week, cost per month, and cost year to date basis.

12. The system of claim 10, wherein the set of cost attributions is associated with organizations, resources, clouds, and features.

* * * * *